US009399463B2

(12) United States Patent
Chen et al.

(10) Patent No.: US 9,399,463 B2
(45) Date of Patent: Jul. 26, 2016

(54) AUTOMATIC TRACKING COLLISION AVOIDANCE SYSTEM AND METHOD THEREOF

(71) Applicant: Industrial Technology Research Institute, Hsin-Chu (TW)

(72) Inventors: Long-Der Chen, Hsinchu County (TW); Dau-Chen Huang, Hsinchu County (TW); Pai-Wei Cheng, Taipei (TW); Ke-Horng Chen, Hsinchu (TW); Shin-Chi Lai, Tainan (TW); Kuo-Chen Kao, Kaohsiung (TW); Sheau-Fang Lei, Tainan (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 12 days.

(21) Appl. No.: 14/582,596

(22) Filed: Dec. 24, 2014

(65) Prior Publication Data

US 2016/0129906 A1    May 12, 2016

(30) Foreign Application Priority Data

Nov. 7, 2014    (TW) .............................. 103138799 A

(51) Int. Cl.
*G06F 7/70* (2006.01)
*B60W 30/08* (2012.01)
*B60T 7/22* (2006.01)

(52) U.S. Cl.
CPC . *B60W 30/08* (2013.01); *B60T 7/22* (2013.01)

(58) Field of Classification Search
CPC ..... G01S 17/936; G01S 7/4808; B60R 11/04; B60R 1/00; B60R 1/04; B60R 1/12; B60R 2001/1223
USPC .............................. 701/36, 70; 340/438, 425.5
See application file for complete search history.

(56) References Cited

U.S. PATENT DOCUMENTS 4,257,703 A * 3/1981 Goodrich ................ G01S 11/12
                                                           340/436
5,357,438 A    10/1994 Davidian
(Continued)

FOREIGN PATENT DOCUMENTS

CN        101471993        7/2009
CN        202275450        6/2012
(Continued)

OTHER PUBLICATIONS

H. Hirschmuller, "Accurate and efficient stereo processing by semi-global matching and mutual information," Computer Vision and Pattern Recognition, 2005. CVPR 2005. IEEE Computer Society Conference on ., vol. 2, pp. 807-814 , Jun. 2005.
(Continued)

*Primary Examiner* — Gertrude Arthur Jeanglaud
(74) *Attorney, Agent, or Firm* — WPAT, PC; Justin King

(57) ABSTRACT

An automatic tracking collision avoidance method has following steps: taking images in front of an origin vehicle by at least two photograph units; the images delivering to a calculation assembly, to transform the images from three primary colors images to grey images; having a relative vehicle speed of the front vehicle corresponded to the original vehicle according to the grey images; and according to the grey images the calculation assembly having a relative vehicle speed that the front vehicle corresponded to the original vehicle; the calculation assembly having a safe distance according to the relative vehicle speed, if the safe distance is great than a distance that between the original vehicle and the front vehicle, an alarm module generating an alert signal.

18 Claims, 5 Drawing Sheets

(56) References Cited

U.S. PATENT DOCUMENTS

| | | | | |
|---|---|---|---|---|
| 8,260,537 | B2* | 9/2012 | Breed | B60W 30/16 701/301 |
| 8,666,590 | B2 | 3/2014 | Follmer et al. | |
| 2006/0132295 | A1 | 6/2006 | Gern et al. | |
| 2015/0120138 | A1* | 4/2015 | Zeng | B62D 15/0265 701/41 |

FOREIGN PATENT DOCUMENTS

| | | |
|---|---|---|
| TW | I302504 | 11/2008 |
| TW | I332454 | 11/2010 |
| TW | M478859 | 5/2014 |
| TW | 201427852 | 7/2014 |

OTHER PUBLICATIONS

C. Banz, S. Hesselbarth, H. Flatt, H. Blume, P. Pirsch, "Real-time stereo vision system using semi-global matching disparity estimation: Architecture and FPGA-implementation," Embedded Computer Systems (SAMOS), 2010 International Conference on, pp. 93-101, Jul. 2010.

S. Jin, J. Cho, X. D. Pham, K. M. Lee, S.-K. Park, M. Kim, and J. W. Jeon, "FPGA Design and Implementation of a Real-Time Stereo Vision System," Circuits and Systems for Video Technology, IEEE Transactions on, vol. 20, No. 1, pp. 15-26, 2010.

Brewer, N; Liu, N; Wang, L; "Stereo disparity calculation in real-world scenes with informative image partitioning", 25th International Conference of Image and Vision Computing New Zealand(IVCNZ) Nov. 2010 pp. 1-8.

Lin, C. E., Shiao, Y. S., Li, C. C., Yang, S. H., Lin,S. H., and Lin, C. Y, "Real-time remote onboard diagnostics using embedded GPRS surveillance technology" IEEE Transactions on Vehicular Technology, May 2007 vol. 56, No. 3, pp. 1108-1118.

Zhen Zhang; Yifei Wang; "A Novel Algorithm for Disparity Calculation Based on Stereo Vision", Education and Research Conference (EDERC), 4th European Dec. 2010 pp. 180-184.

Lin, C. E., Li, C. C., Yang, S. H., Lin, S. H., and Lin, C. Y. "Development of on-line diagnostics and real time early warning system for vehicles" IEEE Sensors for Industry Conference Feb. 2005 pp. 45-51.

Zhen Zhang; Xiao Ai, "Efficient disparity Calculation Based on Stereo vision with ground obstacle assumption", Signal Processing Conference (EUSIPCO)Proceedings of the 21st European Sep. 2013 pp. 1-5.

Srinivasa, Narayan, "Vision-based vehicle detection and tracking method for forward collision warning in automobiles" Intelligent Vehicle Symposium IEEE 2002. vol. 2.

Taiwan Intellectual Property Office, Office Action issued Nov. 9, 2015.

* cited by examiner

AUTOMATIC TRACKING COLLISION AVOIDANCE SYSTEM AND METHOD THEREOF

CROSS REFERENCE TO RELATED APPLICATION

This application also claims priority to Taiwan Patent Application No. 103138799 filed in the Taiwan Patent Office on Nov. 7, 2014, the entire content of which is incorporated herein by reference.

TECHNICAL FIELD

The present disclosure relates to an automatic tracking collision avoidance system and method thereof, and more particularly, to a tracking collision avoidance system and method thereof capable of keeping a safe distance between an origin vehicle and another vehicle in front of the origin vehicle.

BACKGROUND

In our daily life, the use of vehicles is becoming a very common operation while corresponding the risk of all sort of traffic dispute is increasing. Therefore, there are more and more vehicles to be equipped with a vehicle camcorder for providing video evidence in an accident or dispute.

A vehicle camcorder is used primarily for recording the traffic in front and/or behind a driving vehicle, and thereby, if an accident occurred, the related video from the vehicle camcorder can be used as a circumstantial evidence material for the accident.

Although all the traffic conditions surrounding a driving vehicle can be recorded by the vehicle camcorder mounted thereon and the recorded video can be used as direct proof to an accident, only information after a vehicle crash or accident is recoded but there is no way of providing any warning prior to the vehicle crash or accident. Consequently, there are different kinds of early warning systems being developed.

Nevertheless, in the operation of one of those early warning systems, an alarm can be issued at any time and may come as a surprise to the driver as the driving status of a vehicle having the early warning system mounted thereon is not included in the calculation logic of the early warning system, and thus the driver may be shocked and can't respond to the alarm in time for preventing accident. Therefore, it is in need of an improved early warning system.

SUMMARY

In an embodiment, the present disclosure provides an automatic tracking collision avoidance method, comprising the steps of: taking images in front of an origin vehicle by at least two photograph units; delivering the images to a calculation assembly for transforming the images from images of three primary colors to grey-level images; obtaining a relative vehicle speed of the front vehicle corresponded to the original vehicle according to the grey-level images; and enabling the calculation assembly to calculate and obtain a safe distance according to the relative vehicle speed, while making an evaluation to determining whether the safe distance is great than a distance between the original vehicle and the front vehicle, if so, enabling an alarm module to generate an alert signal.

In another embodiment, the present disclosure provides an automatic tracking collision avoidance system, which comprises:
an on-board module; and
a calculation assembly, connected to the on-board module for signal transmission, further comprising:
an image capturing module, having at least two photograph units;
an image processing module, connected to the image capturing module for signal transmission, and further comprising:
a grey-level processing unit, connected to the image capturing module for transforming an image of three primary colors that is received from the image capturing module into a grey-level image;
an alignment unit, connected to the grey-level processing unit for performing a level calibration process and a background light calibration process upon the image of three primary colors while transmitting the calibrated image of three primary colors to the grey-level processing unit; and
an edge detection unit, connected to the grey-level processing unit for detecting and obtaining image edges according to the grey-level image;
a calculation module, connected to the on-board module and the image processing module, and further comprising:
a depth calculation unit, connected to the edge detection unit for calculating and thus obtaining a depth value and a disparity according to the detected image edges;
a tail-light detection unit, connected to the depth calculation unit for calculating and thus obtaining a front-vehicle-tail-light depth value according to the depth value; and
a distance conversion unit, connected to the tail-light detection unit for calculating and thus obtaining an actual distance and a vehicle speed;
and
an alarm module, connected to the calculation module for generating an alarm signal in a condition when the actual distance is smaller than a safe distance.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1:
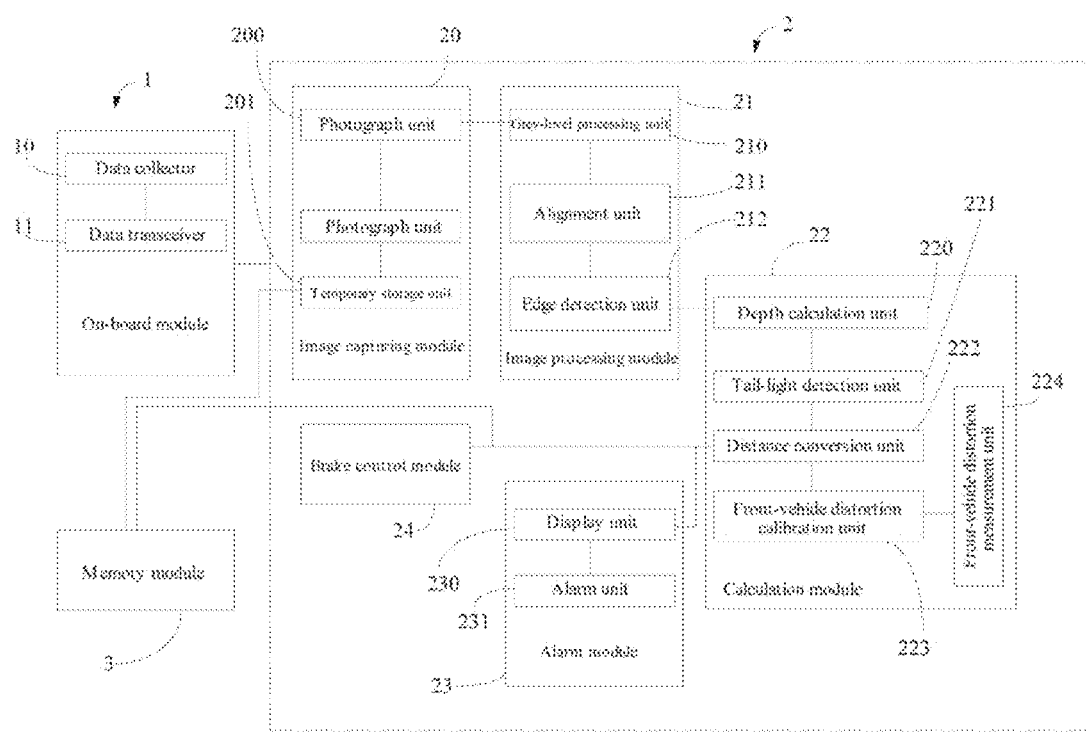
FIG. 1 is a schematic diagram showing an automatic tracking collision avoidance system according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Please refer to FIG. 1, which is a schematic diagram showing an automatic tracking collision avoidance system according to an embodiment of the present disclosure. As shown in FIG. 1, the automatic tracking collision avoidance system comprises: an on-board module 1, a calculation assembly 2 and a memory module 3.

The on-board module 1 can be mounted on an origin vehicle, and is composed of: a data collector 10 and a data transceiver 11 in a manner that the data collector 10 is connected to a trip computer of the origin vehicle for collecting vehicle information, such as speed of the origin vehicle; and the data transceiver 11 is connected to the data collector 10 for transceiving the vehicle information. It is noted that the data transceiver 11 can be a blue-tooth device or a WiFi device.

The calculation assembly 2 comprises: an image capturing module 20, an image processing module 21, a calculation module 22, an alarm module 23 and a brake control module 25.

The image capturing module 20 further comprises: at least two photograph units 200 and a temporary storage unit 201, whereas the image capturing module 20 can either be mounted at the front or at the rear of the origin vehicle. In this embodiment, the image capturing module 20 is mounted at the front of the origin vehicle. Moreover, the temporary storage unit 201 is connected to the at least two photograph units 200 so as to store the images captured by the at least two photograph units 200 in a temporary manner while the captured images are waiting to be processed by the image processing module 21.

The image processing module 21 that is connected to the image capturing module 20 is composed of a grey-level processing unit 210, an alignment unit 211 and an edge detection unit 212.

The grey-level processing unit 210 is connected to the image capturing module 20 for transforming an image of three primary colors, i.e. Red, Green and Blue, that is received from the image capturing module 20, into a grey-level image.

The alignment unit 211 is connected to the grey-level processing unit 210 for performing a level calibration process and a background light calibration process upon the image of three primary colors while transmitting the calibrated image of three primary colors to the grey-level processing unit 210.

The edge detection unit 212 is connected to the grey-level processing unit 210 for detecting and obtaining image edges according to the grey-level image.

The calculation module 22 is connected to the on-board module 1 and the image processing module 21, and further comprises: a depth calculation unit 220, a tail-light detection unit 221, a front-vehicle distance measurement unit 224, a distance conversion unit 222, and a front-vehicle distortion calibration unit 223.

The depth calculation unit 220 is connected to the edge detection unit 212 for calculating and thus obtaining a depth value and a disparity according to the detected image edges.

The tail-light detection unit 221 is connected to the depth calculation unit 220 for calculating and thus obtaining a front-vehicle-tail-light depth value according to the depth value.

The front-vehicle distance measurement unit 224 is connected to the front-vehicle distortion calibration unit 223 and is used for detecting and thus obtaining a front-vehicle distance between the origin vehicle and a vehicle in front of the origin vehicle while transmitting the front-vehicle distance to the front-vehicle distortion calibration unit 223, whereas the front-vehicle distortion calibration unit 223 is used for performing a distance calibration process upon the front-vehicle distance so as to obtained a calibrated front-vehicle distance. It is noted that the front-vehicle distance measurement unit 224 can be an ultrasonic range finder or a laser range finder.

The distance conversion unit 22 is connected to the front-vehicle distortion calibration unit 223 and the tail-light detection unit 221, by that the distance conversion unit 222 is enabled to receive the calibrated front-vehicle distance for allowing the same to obtain an initial value according to the calibrated front-vehicle distance. Moreover, the distance conversion unit 222 is enabled to calculate and obtain the actual speed of the front vehicle and the actual distance between the origin vehicle and the front vehicle according to the initial value and the front-vehicle-tail-light depth value.

The alarm module 23 is connected to the calculation module 22, and is composed of: an audio unit 230 and a display unit 231.

The brake control module 24 is connected to the alarm module 23, and is used for issuing a brake signal to the trip computer.

The memory module 3 is connected to the image capturing module 20 and the calculation module 22, whereas the memory module 3 can be a memory, a hard disk drive, or a memory card.

Figure 2:
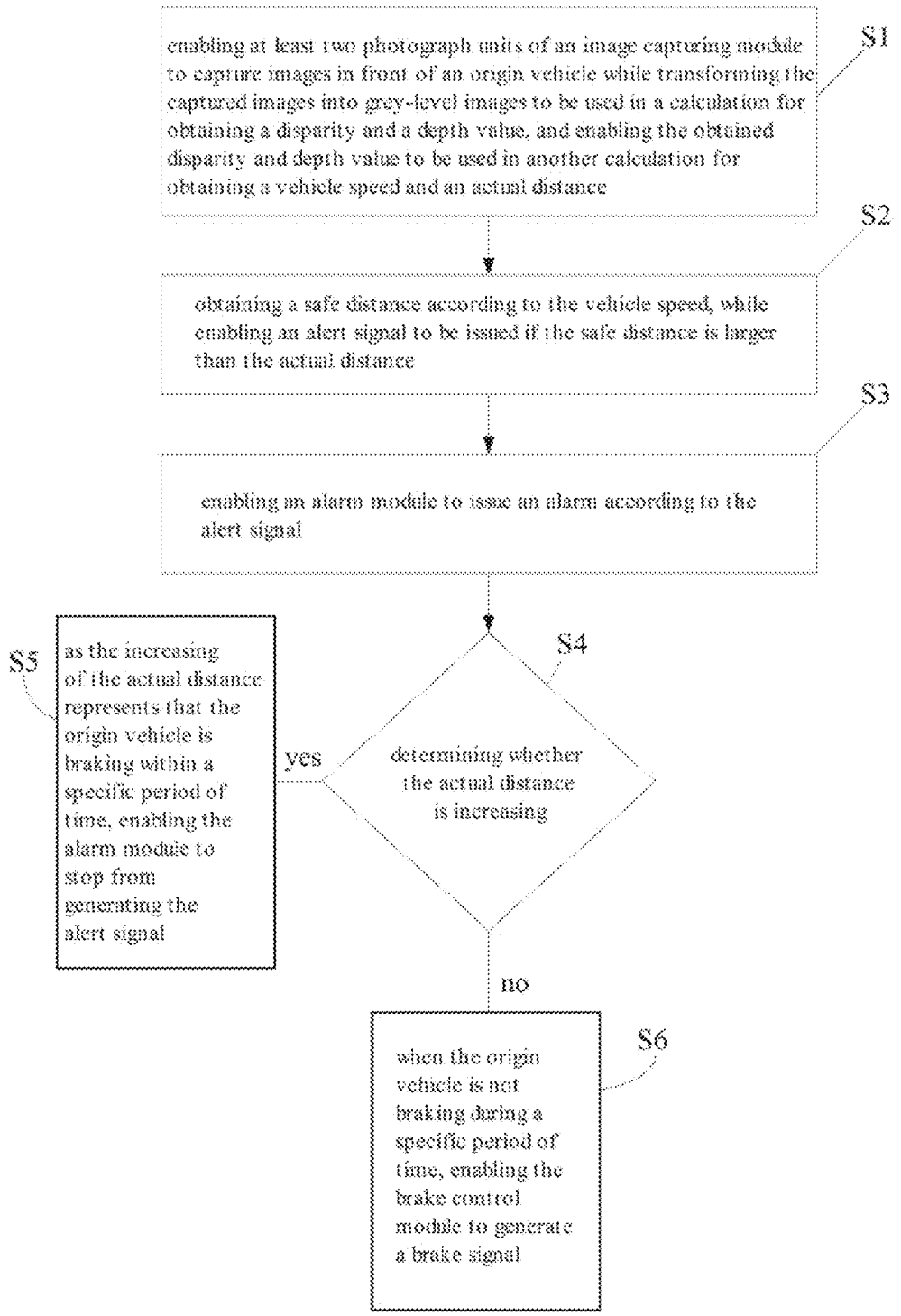
FIG. 2 is a flow depicting steps performed in an automatic tracking collision avoidance method of the present disclosure.

Please refer to FIG. 2, which is a flow depicting steps performed in an automatic tracking collision avoidance method of the present disclosure. As shown in FIG. 2, the automatic tracking collision avoidance method of the present disclosure comprises the steps of: S1, S2, S3, S4, S5 and S6, as described hereinafter.

In step S1, before an origin vehicle is being started, the front-vehicle distance measurement unit 224 is enabled for detecting and thus obtaining a front-vehicle distance between the origin vehicle and a vehicle in front of the origin vehicle while transmitting the front-vehicle distance to the front-vehicle distortion calibration unit 223; and the front-vehicle distortion calibration unit 223 is enabled for receiving the front-vehicle distance to be used in a distance calibration process so as to obtained a calibrated front-vehicle distance while transmitting the calibrated front-vehicle distance to the distance conversion unit 222; and the distance conversion unit 222 is enabled to perform a calculation according to the calibrated front-vehicle distance for obtaining an initial value.

The image capturing module 20 is composed of at least two photograph units 200 that are to be used for capturing images in front of the origin vehicle. In this embodiment, there are two such photograph units 200 mounted at the front of the origin vehicle so as to capturing front images at different angles.

Thereafter, the front images that are originally RGB images are transmitted to the grey-level processing unit 210 to be transformed into grey-level images. At the same time, the grey-level processing unit 210 also transmits the received RGB images to the alignment unit 211 for allowing the same to perform a level calibration process and a background light calibration process upon the RGB images of three primary colors and then transmit the calibrated RGB images back to the grey-level processing unit 210 to be transformed into grey-level images. In an embodiment, the RGB images of three primary colors is transformed into grey-level images using the following formula:

Grey=0.299×Red+0.587×Green+0.114×Blue.

Thereafter, the grey-level images are transmitted to the edge detection unit 212 where they are processed for edge detection.

In an embodiment, the edge detection of the edge detection unit 212 is performed using a Sobel operator, which is a discrete differentiation operator for computing an approximation of the gradient of the image intensity function. At each point in the image, the result of the Sobel operator is either the corresponding gradient vector or the norm of this vector. The Sobel operator is based on convolving the image with a small, separable, and integer valued filter in horizontal and vertical direction and is therefore relatively inexpensive in terms of computations.

The operator uses two 3×3 kernels which are convolved with the original image to calculate approximations of the derivatives—one for horizontal changes, and one for vertical. If we define A as the source image, i.e. one of the aforesaid grey-level images, and $G_x$ and $G_y$ are two images which at each point contain the horizontal and vertical derivative approximations, the computations are as follows:

$$G_x = \begin{bmatrix} 1 & 0 & -1 \\ 2 & 0 & -2 \\ 1 & 0 & -1 \end{bmatrix} * A,$$

$$G_y = \begin{bmatrix} -1 & -2 & -1 \\ 0 & 0 & 0 \\ 1 & 2 & 1 \end{bmatrix} * A.$$

At each point in the image, the resulting gradient approximations can be combined to give the gradient magnitude, using:

$$G = \sqrt{G_x^2 + G_y^e}.$$

Using this information, we can also calculate the gradient's direction:

$$\Theta = \arctan\left(\frac{G_y}{G_x}\right).$$

where, for example, $\Theta$ is 0 for a vertical edge which is lighter on the right side, and $\Theta$ is $\pi$ for a vertical edge which is lighter on the left side. Thereby, by the gradient magnitude of the Sobel operator, an algorithm can be designed for determining the location of an edge in an image.

The result of edge detection from the edge detection unit is transmitted to the depth calculation unit 220 to be used as a base in a calculation of disparity and depth perception for obtaining a depth value and a disparity accordingly.

Figure 3:
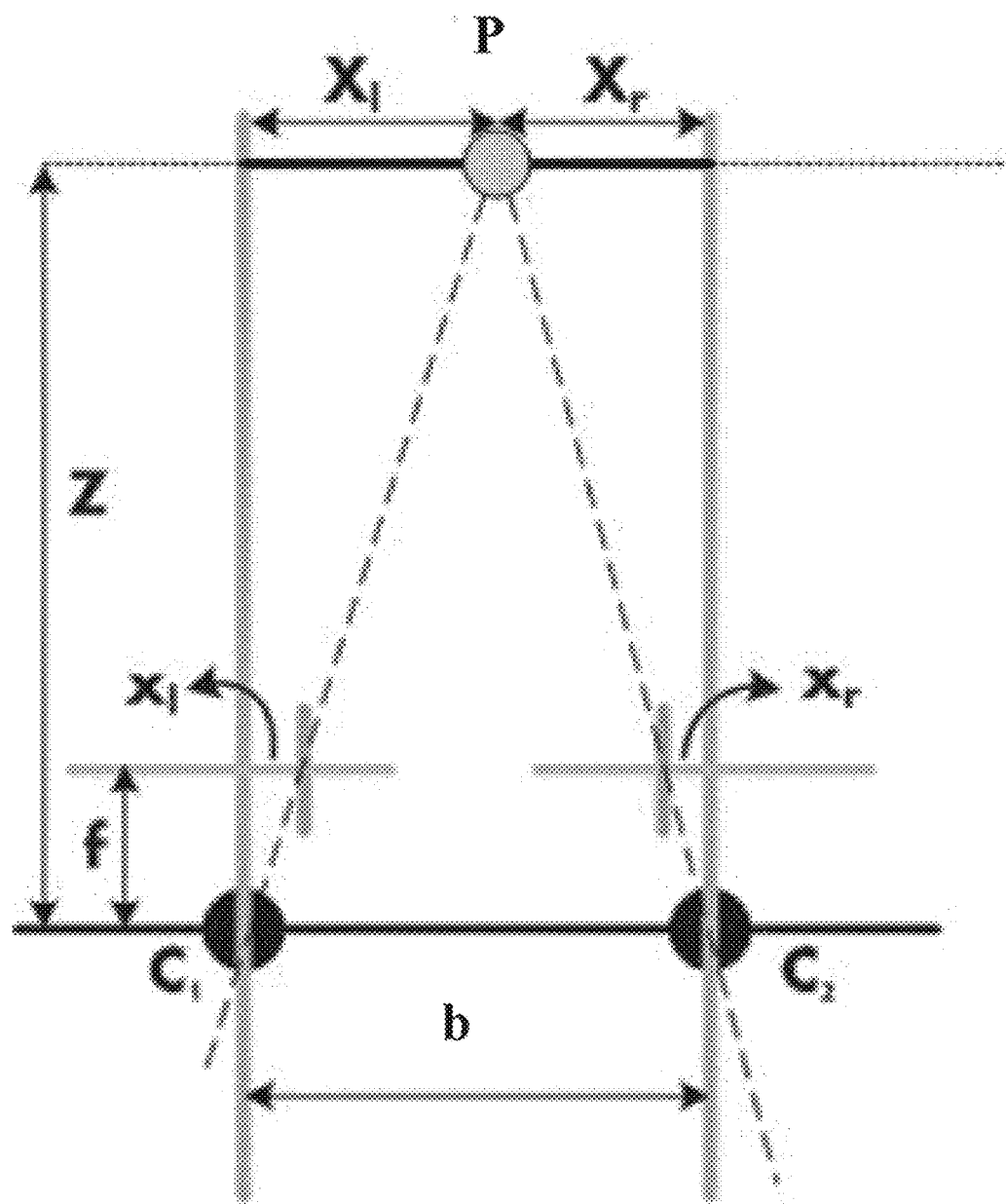
FIG. 3 is a diagram depicting relationship between depths at different points in an image.

Please refer to FIG. 3, which is a diagram depicting relationship between depths at different points in an image. In FIG. 3, the system of the present invention has two photograph units C1 and C2, that are arranged at the left corner and the right corner respectively, arranged apart from each other by a distance b, while each is being designed with a focal length f, and the front vehicle is located at position P. Accordingly, the formula of the disparity is as following:

$$X_l = \frac{x_l}{f} Z;$$

$$X_r = \frac{x_r}{f} Z;$$

$$X_r - X_l = b$$

$$\frac{x_r}{f} Z - \frac{x_l}{f} Z = b;$$

$$Z = \frac{bf}{(x_r - x_l)} = \frac{bf}{D}$$

$$D = X_l - X_r$$

where,
Z is a depth value, representing the distance between the origin vehicle and the front vehicle or even the depth of field (DOF);
$X_r$ and $X_l$ are respectively the relative horizontal distances of C2 and C1 to the front vehicle P;
D is the disparity.

In an image processing based upon pixel whereas 1 cm equals to about 38 pixels, the depth value d can be obtained according to the corresponding disparity D.

The depth value is obtained using a semi-global block matching (SGBM) algorithm, which includes the following calculations: a matching cost calculation; a path calculation; a calculation of sum over paths in all directions; and a calculation of choose minimum path and get disparity. The matching cost calculation is performed using the following formulas:

$$C(p, d) = \min\left\{ \begin{array}{l} \max\{0, I_L(p) - I_{Rmax}, I_{Rmin} - I_L(p)\}, \\ \max\{0, I_R(p - d) - I_{Lmax}, I_{Lmin} - I_R(p - d)\} \end{array} \right\}$$

$$I_{Lmax} = \max\left\{ \frac{I_L(p-1) + I_L(p)}{2}, I_L(p), \frac{I_L(p) + I_L(p+1)}{2} \right\}$$

$$I_{Lmin} = \min\left\{ \frac{I_L(p-1) + I_L(p)}{2}, I_L(p), \frac{I_L(p) + I_L(p+1)}{2} \right\}$$

$$I_{Rmax} = \max\left\{ \frac{I_R(p-d-1) + I_R(p-d)}{2}, \right.$$

$$\left. I_R(p-d), \frac{I_R(p-d) + I_R(p-d+1)}{2} \right\}$$

$$I_{Rmin} = \min\left\{ \frac{I_R(p-d-1) + I_R(p-d)}{2}, \right.$$

$$\left. I_R(p-d), \frac{I_R(p-d) + I_R(p-d+1)}{2} \right\}$$

wherein,
C(p,d) represents the cost function of a left and/or a right image;
$I_L$ and $I_R$ are respectively the grey-level functions of a left and/or a right image relative to a baseline;
$I_{Lmin}$ and $I_{Rmin}$ are respectively the minimum grey-level functions of a left and/or a right image relative to a baseline;
$p_x$ is the coordinate in x direction;
d represents the disparity.

$$C(p_x, p_y, d) = \sum_{p_y-1 \leq p_y \leq p_y+1}^{3} \sum_{p_x-1 \leq p_x \leq p_x+1}^{3} \left\{ \min \left\{ \begin{array}{l} \max\{0, I_L(p_x, p_y) - I_{Rmax}, I_{Rmin} - I_L(p_x, p_y)\}, \\ \max\{0, I_R(p_x-d, p_y) - I_{Lmax}, I_{Lmin} - I_R(p_x-d, p_y)\} \end{array} \right\} \right\}$$

$$I_{Lmax} = \max\left\{ \frac{I_L(p_x-1, p_y) + I_L(p_x, p_y)}{2}, I_L(p_x, p_y), \frac{I_L(p_x, p_y) + I_L(p_x+1, p_y)}{2} \right\}$$

$$I_{Lmin} = \min\left\{ \frac{I_L(p_x-1, p_y) + I_L(p_x, p_y)}{2}, I_L(p_x, p_y), \frac{I_L(p_x, p_y) + I_L(p_x+1, p_y)}{2} \right\}$$

$$I_{Rmax} = \max\left\{ \frac{I_R(p_x-1, p_y) + I_R(p_x-d, p_y)}{2}, I_R(p_x-d, p_y), \frac{I_R(p_x-d, p_y) + I_R(p_x-d+1, p_y)}{2} \right\}$$

$$I_{Rmin} = \min\left\{ \frac{I_R(p_x-d-1, p_y) + I_R(p_x-d, p_y)}{2}, I_R(p_x-d, p_y), \frac{I_R(p_x-d, p_y) + I_R(p_x-d+1, p_y)}{2} \right\}$$

wherein, $I_{Lmax}$ and $I_{Rmax}$ are respectively the maximum grey-level functions of a left and/or a right image relative to a baseline;

$p_x$ is the coordinate in x direction;

$p_y$ is the coordinate in x direction.

From the above description, it is noted that although the matching cost is calculated and obtained based upon the design of block, erroneous coefficients are still a possibility, especially when the image area being processed is poor in texture or fuzzy. Therefore, a semi-global matching algorithm is adopted for optimizing the aforesaid matching cost. In this optimization, $L_r(p-r)$ represents the path value of a pixel located in front in r direction; P1 is a punish value representing the change of disparity d; P2 represents the discontinuous of the disparity; and $\Delta d$ represents the minimum change in a pixel. Thereby, the path value is calculation using the following formula:

$$L_r(p, d) = C(p, d) + \min\left( \begin{array}{l} L_r(p-r, d-1) + P1, \\ L_r(p-r, d) + P1, \\ L_r(p-r, d+1) + P1, \\ \min_i L_r(p-r, i) + P2 \end{array} \right) - \left( \min_i L_r(p-r, i) \right)$$

Accordingly, in an embodiment, the path calculation of the present disclosure can be performed in four directions, i.e. 0°, 45°, 90°, and 135°. The path calculation includes the following two steps: (1) selecting the minimum of the following four values: the value of d−1 in prior direction, the value of d of current direction, the value of d+1 with P1; (2) adding the selected minimum with the current matching cost C(x,d) while subtracting the minimum path value of the prior direction. Accordingly, the path calculation can be performed using the following formulas:

$$L_{0°}(x, d) = C(x, d) + \min\left( \begin{array}{l} L_{0°}(x-r, d-1) + P1, \\ L_{0°}(x-r, d) + P1, \\ L_{0°}(x-r, d+1) + P1, \\ \min_i L_{0°}(x-r, i) + P2 \end{array} \right) - \left( \min_i L_{0°}(x-r, i) \right)$$

$$L_{45°}(x, d) = C(x, d) + \min\left( \begin{array}{l} L_{45°}(x-r, d-1) + P1, \\ L_{45°}(x-r, d) + P1, \\ L_{45°}(x-r, d+1) + P1, \\ \min_i L_{45°}(x-r, i) + P2 \end{array} \right) - \left( \min_i L_{45°}(x-r, i) \right)$$

$$L_{90°}(x, d) = C(x, d) + \min\left( \begin{array}{l} L_{90°}(x-r, d-1) + P1, \\ L_{90°}(x-r, d) + P1, \\ L_{90°}(x-r, d+1) + P1, \\ \min_i L_{90°}(x-r, i) + P2 \end{array} \right) - \left( \min_i L_{90°}(x-r, i) \right)$$

$$L_{135°}(x, d) = C(x, d) + \min\left( \begin{array}{l} L_{135°}(x-r, d-1) + P1, \\ L_{135°}(x-r, d) + P1, \\ L_{135°}(x-r, d+1) + P1, \\ \min_i L_{135°}(x-r, i) + P2 \end{array} \right) - \left( \min_i L_{135°}(x-r, i) \right)$$

During the optimization of the matching cost, after the pixel values of different directions are obtained according the aforesaid calculation, they are added together using the following formula:

$$S(p, d) = \sum_r L_r(p, d).$$

In the aforesaid embodiment of the four directions, the totality formula is represented as following:

$$S(x,d) = L_{0°}(x,d) + L_{45°}(x,d) + L_{90°}(x,d) + L_{135°}(x,d)$$

In the step of selecting the minimum path value for obtaining the depth value, there are more than one S(p,d) to be obtained after the depth value of each individual pixel is calculated and selected, by that a minimum $$\min_d S(p, d)$$

is selected to the depth value of this pixel in a formula as following:

```
for d from 0 to a maximum searching area
    if ( S_present < S(x,d))
        S_present = S_present
        disparity = no change
    else
        S_present = S(x,d)
        disparity = arg_d(S(x,d))
```

Thus, when $S_{present} < S(x,d)$, it represents that the similarity of the right image is higher than before, and thus the value of $S_{present}$ is replaced by the current value of S(x,d) while the disparity is updated to the current depth value. On the other hand, when $S_{present} > S(x,d)$, no change will be made.

To sum up, the object of the aforesaid semi-global block matching (SGBM) algorithm can be summarized as following: (1) determining the disparity inside a searching area for obtaining the depth value of a pixel; (2) repeating the matching cost calculation, the path calculation, and the calculation of sum over paths in all directions; (3) choosing minimum path and getting disparity.

The depth calculation unit 22 transmits the depth value to the tail-light detection unit 221 to be used as a base in a calculation for obtaining a front-vehicle-tail-light depth value while transmitting the front-vehicle-tail-light depth value to the distance conversion unit 222.

Figure 4:
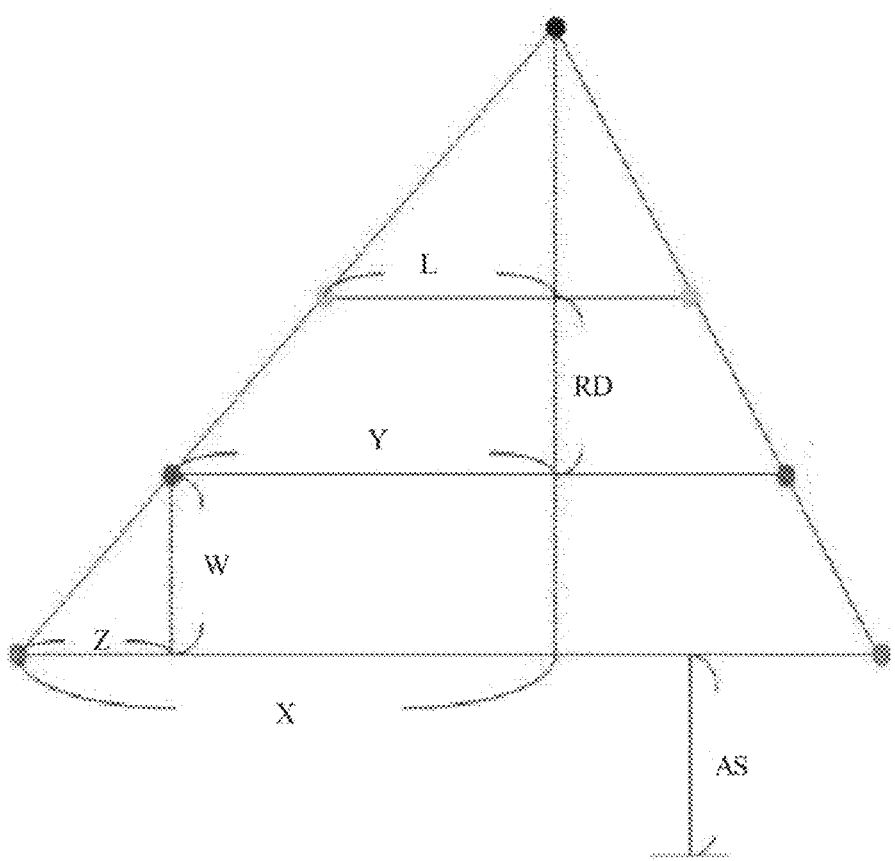
FIG. 4 is a schematic diagram showing the relationship between an origin vehicle and the tail light of another vehicle in front of the origin vehicle.

Please refer to FIG. 4, which is a schematic diagram showing the relationship between an origin vehicle and the tail light of another vehicle in front of the origin vehicle. The distance conversion unit 222 is used for calculating and thus obtaining an actual distance and a vehicle speed according to the initial value and the front-vehicle-tail-light depth value.

Operationally, the distance conversion unit 222 is enabled to perform an automatic calibration initiation process, by that distances relating to two tail lights can be obtained, i.e. (X,Y). Thereby, an actual distance can be calculated using the distances (X,Y) that is scaled by a scale and adjusted by the slope ratio of the captured image.

In FIG. 4, the first calibration distance of a first tail light is S; the second calibration distance of a second tail light is S+W; the actual distance of a third tail light is D+S+W; and the ratio between the captured image and actual distance is 10 m. Thus, $Z=X-Y$; M (slope ratio)$=W\div Z$; $D=(Y-L)\times M$; $(D+S+W)\times scale=$actual distance. It is noted that X, Y, W, S, and L are all distances that can be obtained by the depth calculation unit 220 and the distance conversion unit 222.

Figure 5:
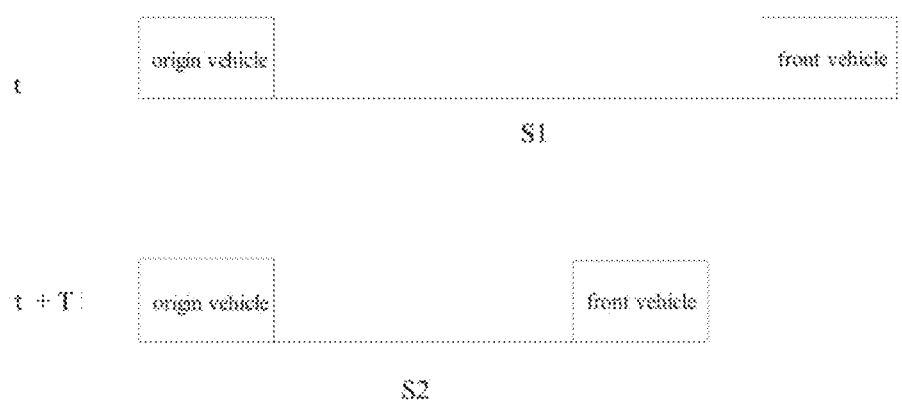
FIG. 5 is a schematic diagram showing the relative speed between two vehicles.

Please refer to FIG. 5, which is a schematic diagram showing the relative speed between two vehicles. The distance conversion unit 222 can be used for obtaining an actual distance. Assuming that the distance conversion unit 222 obtains a first actual distance $S_1$ at time $t_0$, and then obtains a second actual distance $S_2$ at time $t_0+T$, consequently the relative speed between the origin vehicle and the front vehicle is $V=(S_1-S_2)\div T$.

At step S2, the distance conversion unit 222 is used for obtaining a safe distance according to the aforesaid relative speed in a manner that: the safe distance=response time× relative speed+braking distance. It is noted that the response time and the braking distance can be varied according the driving condition and the road condition, as stated in the following table.

| | Friction coefficient | speed (km/hr) | | | | | | | | | | |
|---|---|---|---|---|---|---|---|---|---|---|---|---|
| | | 20 | 25 | 30 | 35 | 40 | 45 | 50 | 55 | 60 | 65 | 70 |
| tar | | | | | | | | | | | | |
| (new) | 0.85 | 1.8 | 2.3 | 4.2 | 5.6 | 7.4 | 9.3 | 11.5 | 14 | 16.6 | 19.9 | 23 |
| dry (1~3 yr) | 0.75 | 2 | 3.2 | 4.6 | 6.4 | 8.4 | 10.5 | 13 | 16 | 18 | 22.8 | 26 |
| parched (>3 yr) | 0.7 | 2.2 | 3.4 | 5 | 6.9 | 9 | 11.5 | 14.1 | 17 | 20.2 | 24 | 27.9 |
| dam (new) | 0.8 | 1.9 | 3.2 | 4.4 | 6 | 8.8 | 10 | 12.2 | 15 | 17.9 | 21 | 24.5 |
| wet (1~3 yr) | 0.65 | 2.4 | 3.7 | 5.4 | 7.4 | 9.5 | 12.2 | 15.4 | 18.4 | 22 | 26 | 30 |
| (>3 yr) | 0.6 | 2.6 | 4.1 | 5.9 | 8 | 10.5 | 13.4 | 16.5 | 20 | 24 | 28.5 | 32.2 |
| concrete | | | | | | | | | | | | |
| (new) | 0.9 | 1.7 | 2.7 | 3.8 | 5.3 | 6.9 | 8.9 | 10.9 | 13.2 | 16 | 18.6 | 21.8 |
| dry (1~3 yr) | 0.78 | 1.9 | 2.2 | 4.5 | 6 | 7.9 | 10.2 | 12.5 | 15 | 18.2 | 21.1 | 25 |
| parched (>3 yr) | 0.7 | 2.2 | 2.5 | 5 | 6.7 | 8.9 | 11.4 | 14.2 | 17 | 20.5 | 24 | 28 |
| dam (new) | 0.78 | 1.9 | 3.1 | 4.5 | 6 | 7.9 | 10.2 | 12.5 | 15 | 18.2 | 21.1 | 25 |
| wet (1~3 yr) | 0.7 | 2.2 | 3.5 | 5 | 6.7 | 8.9 | 11.4 | 14.2 | 17 | 20.5 | 24 | 28 |
| (>3 yr) | 0.62 | 2.5 | 3.8 | 5.6 | 7.6 | 10.2 | 12.7 | 16 | 19.1 | 23 | 26.9 | 31.5 |
| sand | 0.68 | 2.3 | 3.1 | 5.2 | 7.2 | 9 | 11.6 | 14 | 17.2 | 21 | 24 | 28 |

It is noted that after braking, a travelling vehicle will keep moving for a specific distance. The following table describes the relationship between the braking distance in relative to the response time.

| | Friction coefficient | speed (km/hr) | | | | | | | | | | |
|---|---|---|---|---|---|---|---|---|---|---|---|---|
| | | 20 | 25 | 30 | 35 | 40 | 45 | 50 | 55 | 60 | 65 | 70 |
| tar | | | | | | | | | | | | |
| (new) | 0.85 | 1.8 | 2.3 | 4.2 | 5.6 | 7.4 | 9.3 | 11.5 | 14 | 16.6 | 19.9 | 23 |
| dry (1~3 yr) | 0.75 | 2 | 3.2 | 4.6 | 6.4 | 8.4 | 10.5 | 13 | 16 | 18 | 22.8 | 26 |
| parched (>3 yr) | 0.7 | 2.2 | 3.4 | 5 | 6.9 | 9 | 11.5 | 14.1 | 17 | 20.2 | 24 | 27.9 |
| dam (new) | 0.8 | 1.9 | 3.2 | 4.4 | 6 | 8.8 | 10 | 12.2 | 15 | 17.9 | 21 | 24.5 |
| wet (1~3 yr) | 0.65 | 2.4 | 3.7 | 5.4 | 7.4 | 9.5 | 12.2 | 15.4 | 18.4 | 22 | 26 | 30 |
| (>3 yr) | 0.6 | 2.6 | 4.1 | 5.9 | 8 | 10.5 | 13.4 | 16.5 | 20 | 24 | 28.5 | 32.2 |
| concrete | | | | | | | | | | | | |
| (new) | 0.9 | 1.7 | 2.7 | 3.8 | 5.3 | 6.9 | 8.9 | 10.9 | 13.2 | 16 | 18.6 | 21.8 |
| dry (1~3 yr) | 0.78 | 1.9 | 2.2 | 4.5 | 6 | 7.9 | 10.2 | 12.5 | 15 | 18.2 | 21.1 | 25 |
| parched (>3 yr) | 0.7 | 2.2 | 2.5 | 5 | 6.7 | 8.9 | 11.4 | 14.2 | 17 | 20.5 | 24 | 28 |
| wet (new) | 0.78 | 1.9 | 3.1 | 4.5 | 6 | 7.9 | 10.2 | 12.5 | 15 | 18.2 | 21.1 | 25 |
| wet (1~3 yr) | 0.7 | 2.2 | 3.5 | 5 | 6.7 | 8.9 | 11.4 | 14.2 | 17 | 20.5 | 24 | 28 |
| (>3 yr) | 0.62 | 2.5 | 3.8 | 5.6 | 7.6 | 10.2 | 12.7 | 16 | 19.1 | 23 | 26.9 | 31.5 |
| sand | 0.68 | 2.3 | 3.1 | 5.2 | 7.2 | 9 | 11.6 | 14 | 17.2 | 21 | 24 | 28 |

Moreover, the distance conversion unit 222 is used for comparing the safe distance to an actual distance so as to issue an alert signal to an alarm module 23 when the safe distance is larger than the actual distance.

At step S3, when the alarm module 23 receives the alert signal, the alert signal is used for enabling one procedure selected from the group consisting of: enabling an audio unit 231 to generate an alarming sound, and enabling a display unit 230 to display the alert signal. It is noted that the audio unit 231 and the display unit 230 can be configured to operate independently or simultaneously. Moreover, the display unit 230 can be configured for displaying images captured in step S1, whereas the captured image, the initial value, the disparity, the depth value, the front-vehicle-tail-light depth value, the actual distance and the safe distance can all be stored in the memory module 3.

At step S4, an evaluation is made for determining whether the actual distance in increasing; if so, the process proceeds to step S5; otherwise, the process proceeds to step S6. At step S5, as the increasing of the actual distance represents that the origin vehicle is braking within a specific period of time, thus the trip computer is enabled to issue a signal to the data transceiver 11 where it is further being sent to the calculation assembly 2 for stopping the alarm module 23 from generating the alert signal. At step S6, when the origin vehicle is not braking during a specific period of time, the brake control module 24 is enabled to generate a brake signal which is being transmitted to the trip computer via the data transceiver 11 so as to enable the origin vehicle to brake and thus the actual distance can be increased.

To sum up, the automatic tracking collision avoidance system of the present disclosure uses at least two photograph units for taking real-time RGB images in front of an origin vehicle while transforming the captured RGB images into grey-level images, and thus performing an edge detection algorithm of Sobel operator upon the grey-level images for edge detection.

Before transform the RGB images into grey-level images, the RGB images are processed by a level calibration process and a background light calibration process while being applied in a calculation of disparity and depth perception for front view and rear view evaluation, and thus obtaining disparity and depth values. By the obtained disparity and depth values, a tail-light identification algorithm can be enabled for obtaining a vehicle distance.

In addition, a data transceiver is used for transmitting the actual speed of the origin vehicle to the calculation assembly to be used in an evaluation for determining whether to issue an alert signal.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. An automatic tracking collision avoidance method, comprising the steps of:
    taking images in front of an origin vehicle by at least two photograph units;
    delivering the images to a calculation assembly for transforming the images from images of three primary colors to grey-level images;
    obtaining a relative vehicle speed of the front vehicle corresponded to the original vehicle according to the grey-level images; and
    enabling the calculation assembly to calculate and obtain a safe distance according to the relative vehicle speed, while making an evaluation to determining whether the safe distance is great than a distance between the original vehicle and the front vehicle, if so, enabling an alarm module to generate an alert signal;
    wherein the images are transmitted to a grey-level processing unit where the images are transformed from images of three primary colors into grey-level images, while an alignment unit is enabled to perform a level calibration process and a background light calibration process upon the image of three primary colors, and thereafter, the calibrated images of three primary colors are transmitted back to the grey-level processing unit to be transformed into the grey-level images.

2. The method of claim 1, wherein an edge detection unit is provided for detecting and obtaining edges of the images, while a depth calculation unit is provided for calculating and thus obtaining a depth value and a disparity according to the detected edges of the images.

3. The method of claim 2, wherein the depth value is obtained using a semi-global block matching (SGBM) algorithm.

4. The method of claim 2, wherein the semi-global block matching (SGBM) algorithm includes the following calculations: a matching cost calculation; a path calculation; a calculation of sum over paths in all directions; and a calculation of choose minimum path and get disparity.

5. The method of claim 2, wherein a tail-light detection unit is used for obtaining a front-vehicle-tail-light depth value according to the depth value; and a distance conversion unit is used for calculating and thus obtaining an actual distance and a vehicle speed according to the front-vehicle-tail-light depth value.

6. The method of claim 5, wherein a front-vehicle distance measurement unit is used for detecting and thus obtaining a front-vehicle distance between the origin vehicle and a vehicle in front of the origin vehicle; a front-vehicle distortion calibration unit is used for receiving the front-vehicle distance to be used in a distance calibration process so as to obtained a calibrated front-vehicle distance to be transmitted to the distance conversion unit, while enabling the distance conversion unit to perform a calculation according to the calibrated front-vehicle distance for obtaining an initial value, and thus obtaining the actual distance and the vehicle speed according to the initial value and the front-vehicle-tail-light depth value.

7. The method of claim 1, wherein a distance conversion unit is used for comparing the safe distance to an actual distance so as to issue an alert signal to an alarm module when the safe distance is larger than the actual distance; and the alert signal is used for enabling one procedure selected from the group consisting of: enabling an audio unit to generate an alarming sound, and enabling a display unit to display the alert signal.

8. The method of claim 1, further comprising the step of:
    making an evaluation to determining whether the actual distance is increasing, if so, stopping the alarm module from generating the alert signal; otherwise, enabling a brake signal to be generate for enabling the origin vehicle to brake when the origin vehicle is not braking during a specific period of time.

9. An automatic tracking collision avoidance system, comprising:
   an on-board module; and
   a calculation assembly, connected to the on-board module for signal transmission, further comprising:
      an image capturing module, having at least two photograph units;
      an image processing module, connected to the image capturing module for signal transmission, and further comprising:
         a grey-level processing unit, connected to the image capturing module for transforming an image of three primary colors that is received from the image capturing module into a grey-level image;
         an alignment unit, connected to the grey-level processing unit for performing a level calibration process and a background light calibration process upon the image of three primary colors while transmitting the calibrated image of three primary colors to the grey-level processing unit; and
         an edge detection unit, connected to the grey-level processing unit for detecting and obtaining image edges according to the grey-level image;
      a calculation module, connected to the on-board module and the image processing module, and further comprising:
         a depth calculation unit, connected to the edge detection unit for calculating and thus obtaining a depth value and a disparity according to the detected image edges;
         a tail-light detection unit, connected to the depth calculation unit for calculating and thus obtaining a front-vehicle-tail-light depth value according to the depth value; and
         a distance conversion unit, connected to the tail-light detection unit for calculating and thus obtaining an actual distance and a vehicle speed according to the front-vehicle-tail-light depth value; and
      an alarm module, connected to the calculation module for generating an alarm signal in a condition when the actual distance is smaller than a safe distance.

10. The system of claim 9, wherein the on-board module further comprises:
   a data collector, connected to a trip computer for signal transmission; and
   a data transceiver, connected to a data collector for signal transmission.

11. The system of claim 10, wherein the data transceiver is a device selected from the group consisting of: a blue-tooth device and a WiFi device.

12. The system of claim 9, wherein the calculation module further comprising: a front-vehicle distance measurement unit and a front-vehicle distortion calibration unit, and the front-vehicle distance measurement unit is connected to the front-vehicle distortion calibration unit and is used for detecting and thus obtaining a front-vehicle distance between the origin vehicle and a vehicle in front of the origin vehicle while transmitting the front-vehicle distance to the front-vehicle distortion calibration unit; and the front-vehicle distortion calibration unit is used for performing a distance calibration process upon the front-vehicle distance so as to obtained a calibrated front-vehicle distance while transmitting the same to the calculation module to be used in a calculation process for obtaining an initial value.

13. The system of claim 12, wherein the front-vehicle distance measurement unit is a device selected from the group consisting of: an ultrasonic ranger finder and a laser range finder.

14. The system of claim 9, wherein the alarm module further comprises: an audio unit and a display unit.

15. The system of claim 9, further comprising:
   a memory module, connected to the image capturing module and the calculation module for signal transmission.

16. The system of claim 15, wherein the memory module is a device selected from the group consisting of: a memory, a hard disk drive and a memory card.

17. The system of claim 9, wherein the calculation assembly further comprises:
   a brake control module, connected to the calculation module for signal transmission.

18. The system of claim 9, wherein the image capturing module further comprises:
   a temporary storage unit, connected to the at least two photograph units for signal transmission.

* * * * *